United States Patent [19]

Emery

[11] 4,077,093
[45] Mar. 7, 1978

[54] FASTENING DEVICES

[76] Inventor: Roger B. Emery, Fuchia Cottage, Glen Auldyn, Ramsey, Isle of Man

[21] Appl. No.: 707,021

[22] Filed: Jul. 20, 1976

[51] Int. Cl.² ............................................. F16G 11/00
[52] U.S. Cl. ...................................................... 24/130
[58] Field of Search ...................... 24/130, 18, 129 R; 128/327

[56] References Cited

U.S. PATENT DOCUMENTS

| 268,407 | 12/1882 | Hughes | 24/130 |
|---|---|---|---|
| 299,819 | 6/1884 | Mason | 24/18 |
| 1,252,260 | 1/1918 | Gilberg | 24/129 R |
| 1,426,945 | 8/1922 | Anderson | 24/130 |
| 1,466,495 | 8/1923 | Watson | 24/129 R |
| 1,778,954 | 10/1930 | Mislin | 24/18 |
| 1,808,636 | 6/1931 | Chesney | 24/18 |
| 1,848,318 | 3/1932 | Ciampi | 24/143 B |
| 1,986,994 | 1/1935 | Armacost | 24/130 |
| 2,813,323 | 11/1957 | Civitelli | 24/129 R |
| 2,936,759 | 5/1960 | Yuhas | 128/327 |
| 3,051,179 | 8/1962 | Dwyer | 128/327 |
| 3,357,674 | 12/1967 | Coanda | 24/130 R |
| 3,374,509 | 3/1968 | Logan | 24/130 |
| 3,654,668 | 4/1972 | Appleton | 24/130 R |
| 3,857,645 | 12/1974 | Klein | 24/129 R |
| 3,910,280 | 10/1975 | Talonn | 24/130 |

FOREIGN PATENT DOCUMENTS 677,450   3/1930   France ................................. 24/130

Primary Examiner—Bernard A. Gelak
Attorney, Agent, or Firm—Berman, Aisenberg & Platt

[57] ABSTRACT

A buckle type fastener has a body part having a through aperture between its ends. At one end there is means for anchoring one end of a cord, and, at the other end, a nose which is slotted longitudinally of the body in a direction towards said aperture. The slot in the nose has side walls which are convergent over part of the depth of the slot and then divergent towards the base of the slot. This enables a cord of appropriate thickness to be forced into the slot through the constriction formed by the inner ends of the convergent wall parts to become entrapped in the portion of the slot below such constriction.

8 Claims, 3 Drawing Figures

U.S. Patent    March 7, 1978    4,077,093
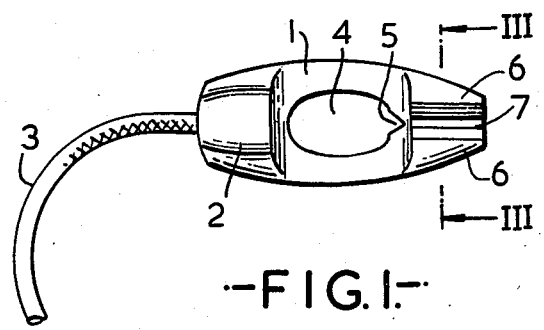
—FIG.1.—
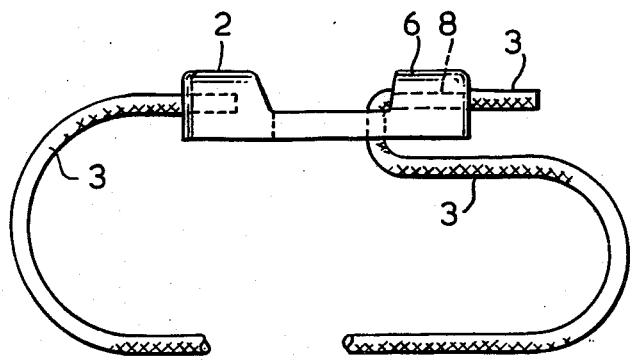
—FIG.2.—
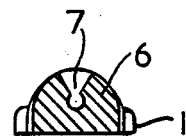
—FIG.3.—

FASTENING DEVICES

The present invention relates to fastening devices of buckle type and to an elastic adjustable cord buckle tie device, particularly, though not exclusively, useful as a lashing of adjustable length which can be rapidly and securely fastened, and equally rapidly released, but which is reliably non-self-releasing, for securing yacht sails to a boom or forestay.

According to the invention there is provided a buckle type fastener comprising a body part having a through aperture between its ends, means at one end for anchoring one end of a cord, and a nose at its opposite end, which nose is slotted longitudinally of the body in a direction towards said aperture, the slot in the nose having side walls which are convergent over part of the depth of the slot and then divergent towards the base of the slot whereby a cord of appropriate thickness forced into the slot through the constriction formed by the inner ends of the convergent wall parts becomes entrapped in the portion of the slot below such constriction.

The various features and advantages of the invention will be apparent from the following description of one embodiment thereof given by way of example and illustrated in the accompanying drawings, of which:

FIG. 1 is a plan view,

FIG. 2 is a side view, of a cord buckle with the cord shown in part only for convenience of illustration, and FIG. 3 is a section on the line III—III of FIG. 1.

The buckle shown in the drawings comprises a body 1 of strong durable material such, for example, as nylon, having at one end a block forming an anchor for one end of an elastic cord of the type commonly known as a shock cord. The body 1 has a central aperture 4 through which the free end of a cord may be passed, and a nose 6 at the end opposite to that of block 2, which nose is slotted at 7 lengthwise of the body 1. The aperture 4 is formed with a V-shaped groove 5 at the base of the slot 7 in the nose 6. As can best be seen from FIG. 3, the slot 7 is of cylindrical shape at its base and then has divergent side walls extending to the outer face of the nose 6, the juncture between the cylindrical part and the divergent walls being the narrowest part of the slot. The widest part of the slot 7 and of the groove 5 are approximately of the same width.

When the above described buckle is embodied in a cord buckle as shown in the drawings, it has attached to it at its anchor end 2 an elastic cord 3. The cord 3 is shown in FIG. 2 as having one end anchored in the block 2 and the other, free, end fastened in the buckle, the intervening part between the ends being omitted.

To use the cord buckle, the cord is passed round the article to be secured, the free end of the cord is threaded through the aperture 4 and laid across the slot 7, and then the cord is pulled tight so that it is extended, its diameter, at least in the region of the slot, is reduced by such extension, and the cord slips through the narrowest part of the slot to locate in the cylindrical portion.

By choosing a cord of which the diameter when unextended is greater than the diameter of this portion of the slot, it is ensured that the cord is gripped in the slot and held fast. Pulling on the free end of the cord when it is so trapped in the slot 7 enables it to be pulled further through the buckle to further tighten the lashing, but movement in the opposite direction is prevented by the V-shaped groove 5 which, at its widest part is preferably no more than the diameter of the cord when unextended.

It is important that the correct relative dimensions of the cord and the two parts of the slot be chosen. It has been found that with a cord of 5mm diameter the cylindrical part of the slot should have a diameter of 4mm and the narrowest part of the slot should be 2.5mm wide, the groove 5 having a maximum width of 5mm.

What I claim is:

1. A buckle-type fastener comprising a body part with a central portion and two end portions on opposite sides of the central portion and having an aperture through the central portion, means at one end portion for anchoring one end of a cord permanently to the body part, and a nose at the other end portion, the nose having a slot which is longitudinal with respect to the body and in a direction towards the aperture, the slot in the nose having an inward end at the aperture, side walls, depth and a solid longitudinal base, the side walls being convergent over part of the depth of the slot and then divergent towards the base of the slot; the convergent wall parts having inner ends which form a constriction and provide a portion of the slot below the constriction so that a cord of appropriate thickness forced into the slot through the constriction is entrapped in the portion of the slot below such constriction, said aperture having a side wall, adjacent the inward end of the slot, formed with a V-shaped groove extending in the direction of the depth of said slot.

2. A fastener as claimed in claim 1 wherein said groove at its widest part is no wider than the widest part of said slot.

3. A buckle-type fastener comprising a body part having a through aperture between its ends, means at one end for anchoring one end of a cord, and a nose at its opposite end, which nose is slotted longitudinally of the body in a direction towards said aperture, the slot in the nose having side walls which are convergent over part of the depth of the slot and then divergent towards the base of the slot whereby a cord of appropriate thickness forced into the slot through the constriction formed by the inner ends of the convergent wall parts becomes entrapped in the portion of the slot below the constriction, wherein the sidewall of said aperture adjacent the inward end of said slot is formed with a groove extending in the direction of the depth of said slot, the groove sides converging towards the slot to pinch the cord when fastened.

4. A fastener as claimed in claim 3 wherein the convergent sides of the groove are straight.

5. A fastener as claimed in claim 3 wherein said groove at its widest part is no wider than the widest part of said slot.

6. A cord buckle tie device comprising a length of cord having a buckle as claimed in claim 3 anchored to one end of said cord by said anchor means, said cord having a diameter greater than the width of the slot below said constriction.

7. A tie device as claimed in claim 6 wherein said cord is an elastic cord of such diameter when unextended that the cord has to be stretched to be received in the portion of the slot below the constriction.

8. A cord buckle tie device comprising a cord in combination with and permanently attached to a buckle-type fastener having a body part with a central portion and two end portions on opposite sides of the central portion and having an aperture through the central portion, means at one end portion for anchoring one end of a cord permanently to the body part, and a nose at the other end portion, the nose having a slot which is longitudinal with respect to the body and in a direction towards the aperture, the slot in the nose having an inward end at the aperture, side walls, depth and a solid longitudinal base, the side walls being convergent over part of the depth of the slot and then divergent towards the base of the slot; the convergent wall parts having inner ends which form a constriction and provide a portion of the slot below the constriction so that a cord of appropriate thickness forced into the slot through the constriction is entrapped in the portion of the slot below such constriction, the cord being permanently attached by the means for anchoring one end thereof, the aperture having sidewalls and means in the sidewalls adjacent the aperture for pinching and thus securing cord passing thereover and through the slot.

* * * * *